United States Patent
Tarlano et al.

(10) Patent No.: US 9,985,829 B2
(45) Date of Patent: May 29, 2018

(54) MANAGEMENT AND PROVISIONING OF CLOUD CONNECTED DEVICES

(71) Applicant: EXABLOX CORPORATION, Sunnyvale, CA (US)

(72) Inventors: Anthony John Tarlano, Menlo Park, CA (US); Tad Hunt, Sunnyvale, CA (US)

(73) Assignee: EXABLOX CORPORATION, Sunnyvale, CA (US)

( * ) Notice: Subject to any disclaimer, the term of this patent is extended or adjusted under 35 U.S.C. 154(b) by 527 days.

(21) Appl. No.: 14/105,099

(22) Filed: Dec. 12, 2013

(65) Prior Publication Data

US 2015/0172114 A1 Jun. 18, 2015

(51) Int. Cl.
*H04L 12/24* (2006.01)
*H04L 29/08* (2006.01)
(Continued)

(52) U.S. Cl.
CPC .......... *H04L 41/0806* (2013.01); *G06F 21/31* (2013.01); *H04L 63/08* (2013.01);
(Continued)

(58) Field of Classification Search
CPC ..... H04L 67/16; H04L 41/0806; H04L 67/02; H04L 67/10; H04L 63/08; G06F 21/31
See application file for complete search history.

(56) References Cited

U.S. PATENT DOCUMENTS 4,656,604 A 4/1987 van Loon
4,660,130 A 4/1987 Bartley et al.
(Continued)

FOREIGN PATENT DOCUMENTS

EP 1285354 2/2003
EP 1285354 B1 * 3/2004 ............. G06F 9/465
(Continued)

OTHER PUBLICATIONS

Office Action dated Nov. 5, 2013, U.S. Appl. No. 13/441,715, filed Apr. 6, 2012.
(Continued)

*Primary Examiner* — Arvin Eskandarnia
*Assistant Examiner* — Juan C Turriate Gastulo
(74) *Attorney, Agent, or Firm* — Maschoff Brennan

(57) ABSTRACT

A method for provisioning of a device or a group of devices discovery and registration service comprises receiving availability messages from unbound devices, receiving a request for the service, correlating the service identifying data to the device identifying data, selecting candidate unbound devices, prompting the user to select an unbound device, or an unbound group of devices, receiving a selected unbound device, or a selected unbound group of devices, from the user, sending a machine generated code to an output device associated with the selected unbound device or group of devices, prompting the user to confirm ownership of the selected unbound device or group of devices, by entering the machine generated code, receiving, from the user, a human entered code, comparing the machine generated code to the human entered code, and based on the comparison, selectively binding the selected device, or the selected group of devices, to the service.

25 Claims, 4 Drawing Sheets

(51) Int. Cl.
  *H04L 29/06* (2006.01)
  *G06F 21/31* (2013.01)
(52) U.S. Cl.
  CPC .............. *H04L 67/02* (2013.01); *H04L 67/10* (2013.01); *H04L 67/16* (2013.01)

(56) References Cited

U.S. PATENT DOCUMENTS

| | | |
|---|---|---|
| 5,420,999 A | 5/1995 | Mundy |
| 5,561,778 A | 10/1996 | Fecteau et al. |
| 5,812,793 A | 9/1998 | Shakib et al. |
| 5,950,205 A | 9/1999 | Aviani, Jr. |
| 6,098,079 A | 8/2000 | Howard |
| 6,154,747 A | 11/2000 | Hunt |
| 6,167,437 A | 12/2000 | Stevens et al. |
| 6,314,435 B1 | 11/2001 | Wollrath et al. |
| 6,356,916 B1 | 3/2002 | Yamatari et al. |
| 6,480,950 B1 | 11/2002 | Lyubashevskiy et al. |
| 6,772,162 B2 | 8/2004 | Waldo et al. |
| 6,839,823 B1 | 1/2005 | See et al. |
| 7,043,494 B1 | 5/2006 | Joshi et al. |
| 7,177,980 B2 | 2/2007 | Milillo et al. |
| 7,197,622 B2 | 3/2007 | Torkelsson et al. |
| 7,266,555 B1 | 9/2007 | Coates et al. |
| 7,293,140 B2 | 11/2007 | Kano |
| 7,392,421 B1 | 6/2008 | Bloomstein et al. |
| 7,403,961 B1 | 7/2008 | Deepak et al. |
| 7,454,592 B1 | 11/2008 | Shah et al. |
| 7,509,360 B2 | 3/2009 | Wollrath et al. |
| 7,539,836 B1 | 5/2009 | Klinkner |
| 7,685,109 B1 | 3/2010 | Ransil et al. |
| 7,725,437 B2 | 5/2010 | Kirshenbaum et al. |
| 7,827,218 B1 | 11/2010 | Mittal |
| 7,895,666 B1 | 2/2011 | Eshghi et al. |
| 7,990,979 B2 | 8/2011 | Lu et al. |
| 8,019,882 B2 | 9/2011 | Rao et al. |
| 8,099,605 B1 | 1/2012 | Billsrom et al. |
| 8,132,168 B2 | 3/2012 | Wires et al. |
| 8,195,623 B2 | 6/2012 | Prahlad et al. |
| 8,239,584 B1 | 8/2012 | Rabe et al. |
| 8,364,887 B2 | 1/2013 | Wong et al. |
| 8,407,438 B1 | 3/2013 | Ranade |
| 8,447,733 B2 | 5/2013 | Sudhakar |
| 8,478,799 B2 | 7/2013 | Beaverson et al. |
| 8,515,911 B1 | 8/2013 | Zhou et al. |
| 8,572,290 B1 | 10/2013 | Mukhopadhyay et al. |
| 8,606,751 B1 | 12/2013 | Starling et al. |
| 8,788,628 B1 | 7/2014 | Taylor et al. |
| 8,868,926 B2 | 10/2014 | Hunt et al. |
| 9,009,202 B2 | 4/2015 | Patterson |
| 9,043,567 B1 | 5/2015 | Modukuri et al. |
| 9,235,479 B1 | 1/2016 | Muntz et al. |
| 9,317,511 B2 | 4/2016 | Kanfi |
| 9,514,137 B2 | 12/2016 | Barrus et al. |
| 9,552,382 B2 | 1/2017 | Barrus |
| 2002/0069340 A1 | 6/2002 | Tindal et al. |
| 2002/0087590 A1 | 7/2002 | Bacon et al. |
| 2003/0028514 A1 | 2/2003 | Lord et al. |
| 2003/0028585 A1* | 2/2003 | Yeager .................. G06F 9/4416 709/201 |
| 2003/0056139 A1 | 3/2003 | Murray et al. |
| 2003/0072259 A1 | 4/2003 | Mor |
| 2003/0101173 A1 | 5/2003 | Lanzatella et al. |
| 2003/0115408 A1 | 6/2003 | Milillo et al. |
| 2004/0093361 A1 | 5/2004 | Therrien et al. |
| 2004/0111610 A1 | 6/2004 | Slick et al. |
| 2004/0158588 A1 | 8/2004 | Pruet |
| 2004/0167898 A1 | 8/2004 | Margolus et al. |
| 2005/0015663 A1 | 1/2005 | Armangau et al. |
| 2005/0071335 A1 | 3/2005 | Kadatch |
| 2005/0080928 A1 | 4/2005 | Beverly et al. |
| 2005/0081041 A1 | 4/2005 | Hwang |
| 2005/0083759 A1 | 4/2005 | Wong et al. |
| 2005/0131900 A1 | 6/2005 | Palliyll et al. |
| 2005/0138271 A1 | 6/2005 | Bernstein et al. |
| 2005/0160170 A1 | 7/2005 | Schreter |
| 2005/0226059 A1 | 10/2005 | Kavuri et al. |
| 2005/0256972 A1 | 11/2005 | Cochran et al. |
| 2006/0039371 A1 | 2/2006 | Castro et al. |
| 2006/0083247 A1 | 4/2006 | Mehta |
| 2006/0101067 A1 | 5/2006 | Kilian-Kehr et al. |
| 2006/0156396 A1 | 7/2006 | Hochfield et al. |
| 2006/0193333 A1 | 8/2006 | Baughan et al. |
| 2006/0212551 A1 | 9/2006 | Kao et al. |
| 2006/0271540 A1 | 11/2006 | Williams |
| 2006/0271604 A1 | 11/2006 | Shoens |
| 2007/0005746 A1 | 1/2007 | Roe et al. |
| 2007/0022149 A1 | 1/2007 | Bacon et al. |
| 2007/0130232 A1 | 6/2007 | Therrien et al. |
| 2007/0171924 A1 | 7/2007 | Eisner et al. |
| 2007/0179997 A1 | 8/2007 | Nooning |
| 2007/0203960 A1 | 8/2007 | Guo |
| 2007/0230368 A1 | 10/2007 | Shi et al. |
| 2007/0233828 A1 | 10/2007 | Gilbert |
| 2007/0271303 A1 | 11/2007 | Menendez et al. |
| 2007/0276838 A1 | 11/2007 | Abushanab et al. |
| 2007/0276843 A1 | 11/2007 | Lillibridge et al. |
| 2008/0005624 A1 | 1/2008 | Kakivaya et al. |
| 2008/0016507 A1 | 1/2008 | Thomas et al. |
| 2008/0052446 A1 | 2/2008 | Lasser et al. |
| 2008/0126434 A1 | 5/2008 | Uysal et al. |
| 2008/0133893 A1 | 6/2008 | Glew |
| 2008/0147872 A1 | 6/2008 | Regnier |
| 2008/0170550 A1 | 7/2008 | Liu et al. |
| 2008/0183973 A1 | 7/2008 | Aguilera et al. |
| 2008/0243879 A1 | 10/2008 | Gokhale et al. |
| 2008/0243938 A1 | 10/2008 | Kottomtharayil et al. |
| 2008/0244199 A1 | 10/2008 | Nakamura et al. |
| 2008/0292281 A1 | 11/2008 | Pecqueur et al. |
| 2009/0031407 A1* | 1/2009 | Kuang .................... G06F 21/31 726/7 |
| 2009/0049240 A1 | 2/2009 | Oe et al. |
| 2009/0094250 A1 | 4/2009 | Dhuse et al. |
| 2009/0100212 A1 | 4/2009 | Boyd et al. |
| 2009/0172139 A1 | 7/2009 | Wong et al. |
| 2009/0198927 A1 | 8/2009 | Bondurant et al. |
| 2009/0199041 A1 | 8/2009 | Fukui et al. |
| 2009/0307292 A1 | 12/2009 | Li et al. |
| 2009/0327312 A1 | 12/2009 | Kakivaya et al. |
| 2010/0023941 A1 | 1/2010 | Iwamatsu et al. |
| 2010/0031000 A1 | 2/2010 | Flynn et al. |
| 2010/0036862 A1 | 2/2010 | Das et al. |
| 2010/0036870 A1 | 2/2010 | Lowry et al. |
| 2010/0049735 A1 | 2/2010 | Hsu |
| 2010/0070725 A1 | 3/2010 | Prahlad et al. |
| 2010/0114336 A1 | 5/2010 | Konieczny et al. |
| 2010/0114905 A1 | 5/2010 | Slavik et al. |
| 2010/0122330 A1 | 5/2010 | McMillan et al. |
| 2010/0161817 A1 | 6/2010 | Xiao et al. |
| 2010/0172180 A1 | 7/2010 | Paley et al. |
| 2010/0191783 A1 | 7/2010 | Mason et al. |
| 2010/0217953 A1 | 8/2010 | Beaman et al. |
| 2010/0228798 A1 | 9/2010 | Kodama et al. |
| 2010/0262797 A1 | 10/2010 | Rosikiewicz et al. |
| 2010/0306269 A1 | 12/2010 | Osmond |
| 2010/0318645 A1 | 12/2010 | Hoole et al. |
| 2010/0325257 A1 | 12/2010 | Goel et al. |
| 2010/0332456 A1 | 12/2010 | Prahlad et al. |
| 2011/0022566 A1 | 1/2011 | Beaverson et al. |
| 2011/0026439 A1 | 2/2011 | Rollins |
| 2011/0029711 A1 | 2/2011 | Dhuse et al. |
| 2011/0034176 A1 | 2/2011 | Lord et al. |
| 2011/0060887 A1 | 3/2011 | Thatcher et al. |
| 2011/0060918 A1* | 3/2011 | Troncoso Pastoriza ................ G06F 21/72 713/189 |
| 2011/0082928 A1 | 4/2011 | Hasha et al. |
| 2011/0106795 A1 | 5/2011 | Maim |
| 2011/0131184 A1 | 6/2011 | Kirshenbaum |
| 2011/0138123 A1 | 6/2011 | Gurajada et al. |
| 2011/0153822 A1 | 6/2011 | Rajan et al. |
| 2011/0213754 A1 | 9/2011 | Bindal et al. |
| 2011/0231374 A1 | 9/2011 | Jain et al. |
| 2011/0231524 A1 | 9/2011 | Lin et al. |

(56) References Cited

U.S. PATENT DOCUMENTS

| | | |
|---|---|---|
| 2011/0264712 A1 | 10/2011 | Ylonen |
| 2011/0264989 A1 | 10/2011 | Resch et al. |
| 2011/0271007 A1 | 11/2011 | Wang et al. |
| 2012/0011337 A1 | 1/2012 | Aizman |
| 2012/0023070 A1 | 1/2012 | Prahlad et al. |
| 2012/0030260 A1 | 2/2012 | Lu et al. |
| 2012/0030408 A1 | 2/2012 | Flynn et al. |
| 2012/0047181 A1 | 2/2012 | Baudel |
| 2012/0060072 A1 | 3/2012 | Simitci et al. |
| 2012/0078915 A1 | 3/2012 | Darcy |
| 2012/0096217 A1 | 4/2012 | Son et al. |
| 2012/0147937 A1 | 6/2012 | Goss et al. |
| 2012/0173790 A1 | 7/2012 | Hetzler et al. |
| 2012/0179808 A1* | 7/2012 | Bergkvist .............. H04L 67/16 709/223 |
| 2012/0179820 A1 | 7/2012 | Ringdahl et al. |
| 2012/0185555 A1 | 7/2012 | Regni et al. |
| 2012/0210095 A1 | 8/2012 | Nellans et al. |
| 2012/0233117 A1 | 9/2012 | Holt et al. |
| 2012/0233251 A1 | 9/2012 | Holt et al. |
| 2012/0278425 A1 | 11/2012 | Maxted |
| 2012/0278511 A1 | 11/2012 | Alatorre et al. |
| 2012/0290535 A1 | 11/2012 | Patel et al. |
| 2012/0290629 A1 | 11/2012 | Beaverson et al. |
| 2012/0310892 A1 | 12/2012 | Dam et al. |
| 2012/0323850 A1 | 12/2012 | Hildebrand et al. |
| 2012/0331462 A1 | 12/2012 | Falko |
| 2012/0331528 A1 | 12/2012 | Fu et al. |
| 2013/0013571 A1 | 1/2013 | Sorenson, III et al. |
| 2013/0041931 A1 | 2/2013 | Brand |
| 2013/0054924 A1 | 2/2013 | Dudgeon et al. |
| 2013/0067270 A1 | 3/2013 | Lee et al. |
| 2013/0073821 A1 | 3/2013 | Flynn et al. |
| 2013/0086004 A1 | 4/2013 | Chao et al. |
| 2013/0086377 A1 | 4/2013 | Cilfone et al. |
| 2013/0091105 A1 | 4/2013 | Bhave et al. |
| 2013/0091180 A1 | 4/2013 | Vicat-Blanc-Primet et al. |
| 2013/0162160 A1* | 6/2013 | Ganton ............... H05B 37/02 315/210 |
| 2013/0166818 A1 | 6/2013 | Sela |
| 2013/0179481 A1 | 7/2013 | Halevy |
| 2013/0185508 A1 | 7/2013 | Talagala et al. |
| 2013/0218934 A1 | 8/2013 | Lin et al. |
| 2013/0232313 A1 | 9/2013 | Patel |
| 2013/0235192 A1 | 9/2013 | Quinn et al. |
| 2013/0246589 A1 | 9/2013 | Klemba et al. |
| 2013/0262638 A1 | 10/2013 | Kumarasamy et al. |
| 2013/0263151 A1 | 10/2013 | Li et al. |
| 2013/0268644 A1 | 10/2013 | Hardin et al. |
| 2013/0268770 A1 | 10/2013 | Hunt et al. |
| 2013/0275381 A1 | 10/2013 | De Schrijvr et al. |
| 2013/0282798 A1 | 10/2013 | McCarthy et al. |
| 2013/0282994 A1 | 10/2013 | Wires et al. |
| 2013/0288668 A1* | 10/2013 | Pragada ............... H04W 12/06 455/426.1 |
| 2013/0311574 A1 | 11/2013 | Lal |
| 2013/0339406 A1 | 12/2013 | Kanfi |
| 2013/0346591 A1 | 12/2013 | Carroll et al. |
| 2013/0346839 A1 | 12/2013 | Dinha |
| 2014/0006580 A1 | 1/2014 | Raghu |
| 2014/0007178 A1 | 1/2014 | Gillum et al. |
| 2014/0059405 A1 | 2/2014 | Syu et al. |
| 2014/0143206 A1 | 5/2014 | Pittelko |
| 2014/0149794 A1 | 5/2014 | Shetty et al. |
| 2014/0297604 A1 | 10/2014 | Brand |
| 2014/0317065 A1 | 10/2014 | Barrus |
| 2014/0335480 A1 | 11/2014 | Asenjo et al. |
| 2014/0351419 A1 | 11/2014 | Hunt et al. |
| 2014/0372490 A1 | 12/2014 | Barrus et al. |
| 2014/0379671 A1 | 12/2014 | Barrus et al. |
| 2015/0012763 A1* | 1/2015 | Cohen ............... H04L 67/125 713/310 |
| 2015/0019491 A1 | 1/2015 | Hunt et al. |
| 2015/0066524 A1 | 3/2015 | Fairbrothers et al. |
| 2015/0081964 A1 | 3/2015 | Kihara et al. |
| 2015/0106335 A1 | 4/2015 | Hunt et al. |
| 2015/0106579 A1 | 4/2015 | Barrus |
| 2015/0220578 A1 | 8/2015 | Hunt et al. |
| 2015/0222616 A1 | 8/2015 | Tarlano et al. |
| 2015/0347043 A1 | 12/2015 | Barron et al. |

FOREIGN PATENT DOCUMENTS

| | | |
|---|---|---|
| EP | 1802048 A1 | 6/2007 |
| EP | 1856853 A1 | 11/2007 |
| EP | 2575379 | 4/2013 |
| EP | 2834749 | 2/2015 |
| EP | 2834943 | 2/2015 |
| EP | 2989549 A1 | 3/2016 |
| EP | 3000205 A1 | 3/2016 |
| EP | 3000289 A2 | 3/2016 |
| EP | 3008647 A1 | 4/2016 |
| EP | 3011428 A1 | 4/2016 |
| EP | 3019960 | 5/2016 |
| EP | 3020259 | 5/2016 |
| EP | 3055794 A1 | 8/2016 |
| EP | 3058466 A1 | 8/2016 |
| EP | 3080969 A1 | 10/2016 |
| EP | 3103023 A1 | 12/2016 |
| EP | 3103025 A2 | 12/2016 |
| JP | 2004252663 A | 9/2004 |
| JP | 2008533570 A | 8/2008 |
| JP | 2010146067 A | 7/2010 |
| JP | 2011095976 A | 5/2011 |
| JP | 2012048424 A | 3/2012 |
| JP | 5996088 B2 | 9/2016 |
| WO | WO 2012092553 A1 | 7/2012 |
| WO | WO 2013101186 A1 | 7/2013 |
| WO | WO2013152357 | 10/2013 |
| WO | WO2013152358 | 10/2013 |
| WO | WO2014176264 | 10/2014 |
| WO | WO2014190093 | 11/2014 |
| WO | WO2014201270 | 12/2014 |
| WO | WO2014205286 | 12/2014 |
| WO | WO2015006371 | 1/2015 |
| WO | WO2015054664 A1 | 4/2015 |
| WO | WO2015057576 A1 | 4/2015 |
| WO | WO2015088761 A1 | 6/2015 |
| WO | WO2015116863 A1 | 8/2015 |
| WO | WO2015120071 A2 | 8/2015 |

OTHER PUBLICATIONS

Notice of Allowance dated Mar. 27, 2014, U.S. Appl. No. 13/441,715, filed Apr. 6, 2012.
Office Action dated Nov. 13, 2013, U.S. Appl. No. 13/441,592, filed Apr. 6, 2012.
Office Action dated May 19, 2014, U.S. Appl. No. 13/441,592, filed Apr. 6, 2012.
Final Office Action dated Nov. 20, 2014, U.S. Appl. No. 13/441,592, filed Apr. 6, 2012.
Advisory Action dated Feb. 19, 2015, U.S. Appl. No. 13/441,592, filed Apr. 6, 2012.
Final Office Action dated Nov. 27, 2015, U.S. Appl. No. 13/441,592, filed Apr. 6, 2012.
Advisory Action dated Feb. 19, 2016, U.S. Appl. No. 13/441,592, filed Apr. 6, 2012.
Final Office Action dated Nov. 27, 2015, U.S. Appl. No. 14/171,651, filed Feb. 3, 2014.
Final Office Action dated Nov. 20, 2015, U.S. Appl. No. 14/055,662, filed Oct. 16, 2013.
Advisory Action dated Jan. 29, 2016, U.S. Appl. No. 14/055,662, filed Oct. 16, 2013.
Office Action dated Dec. 10, 2015, U.S. Appl. No. 13/939,106, filed Jul. 10, 2013.
Non-Final Office Action dated Jan. 11, 2016, U.S. Appl. No. 14/284,351, filed May 21, 2014.
Advisory Action dated Jan. 12, 2016, U.S. Appl. No. 14/171,651, filed Feb. 3, 2014.
Office Action dated Mar. 15, 2016, U.S. Appl. No. 14/171,651, filed Feb. 3, 2014.

(56) References Cited

OTHER PUBLICATIONS

Office Action dated Apr. 5, 2016, U.S. Appl. No. 14/257,905, filed Apr. 21, 2014.
International Search Report dated Aug. 6, 2013 5901PCT Application No. PCT/US2013/035675.
Huck et al. Architectural Support for Translation Table Management in Large Address Space Machines. ISCA '93 Proceedings of the 20th Annual International Symposium on Computer Architecture, vol. 21, No. 2. May 1993. pp. 39-50.
International Search Report dated Aug. 2, 2013 5847PCT Application No. PCT/US2013/035673.
International Search Report dated Sep. 10, 2014 6362PCT Application No. PCT/US2014/035008.
Askitis, Nikolas et al., "HAT-trie: A Cache-conscious Trie-based Data Structure for Strings".
International Search Report dated Sep. 24, 2014 6342PCT Application No. PCT/US2014/039036.
International Search Report dated Oct. 22, 2014 6360PCT Application No. PCT/US2014/043283.
International Search Report dated Nov. 7, 2014 6361PCT Application No. PCT/US2014/042155.
International Search Report dated Jan. 1, 2015 6359PCT Application No. PCT/US2014/060176.
International Search Report dated Feb. 24, 2015 6359PCT Application No. PCT/US2014/060280.
International Search Report dated Mar. 4, 2015 6337PCT Application No. PCT/US2014/067110.
International Search Report dated Apr. 2, 2015 6340PCT Application No. PCT/US2014/045822.
International Sesarch Report dated May 14, 2015 6450PCT Application No. PCT/US2015/013611.
International Sesarch Report dated May 15, 2015 6341PCT Application No. PCT/US2015/014492.
Invitation pursuant to Rule 63(1) dated May 19, 2015 5847EP Application No. 13772293.0.
Extended European Search Report dated Aug. 4, 2015 5901EP Application No. 13771965.4.
Dabek et al. "Wide-area cooperative storage with CFS", Proceedings of the ACM Symposium on Operating Systems Principles, Oct. 1, 2001. pp. 202-215.
Stoica et al. "Chord: A Scalable Peer-to-peer Lookup Service for Internet Applications", Computer Communication Review, ACM, New York, NY, US, vol. 31, No. 4, Oct. 1, 2001. pp. 149-160.
Extended European Search Report dated Aug. 20, 2015 5847EP Application No. 13772293.0.
Office Action dated Mar. 15, 2016 in Japanese Patent Application No. 2015-504769 filed Apr. 8, 2013.
Extended European Search Report dated Aug. 19, 2016 for European Application No. 14788630.3 filed Apr. 22, 2014, pp. 1-7.
Lua, Eng Keong et al., "A Survey and Comparison of Peer-to-Peer Overlay Network Schemes," IEEE Communications Surveys & Tutorials, Second Quarter 2005, vol. 7, No. 2, pp. 72-93.
Sakr, Sherif et al., "A Survey of Large Scale Data Management Approaches in Cloud Environments," IEEE Communications Surveys & Tutorials, Third Quarter 2011, vol. 13, No. 3, pp. 311-336.
Hansen, Jacob Gorm et al., "Lithium: Virtual Machine Storage for the Cloud," SoCC'10, Jun. 10-11, 2010, 12 pages.
Extended European Search Report dated Aug. 19, 2016 for European Application No. 14801473.1 filed May 21, 2014, pp. 1-9.
European Patent Application No. 16185048.2, "Extended European Search Report," Dec. 15, 2016, 11 pages.
Golan-Gueta et al., "Scaling Concurrent Log-Structured Data Stores", The 2014 Ottawa Linux Symposium (OLS '14), Jan. 1, 2015, pp. 1-14.
European Patent Application No. 148104375, "Extended European Search Report," Jan. 3, 2017, 8 pages.
"Extended European Search Report" and "Written Opinion," European Patent Application No. 14823874.4, Jan. 26, 2017, 7 pages.
"Extended European Search Report" and "Written Opinion," European Patent Application No. 16185051.6, dated Jan. 4, 2017, 11 pages.
Eshghi, Kave et al., "Jumbo Store: Providing Efficient Incremental Upload and Versioning for a Utility Rendering Service," FAST '07: 5th USENIX Conference on File and Storage Technologies, Feb. 14, 2007, pp. 123-138.
Rodeh, Ohad, "B-trees, Shadowing, and Clones," ACM Transactions on Storage, vol. 3 No. 4, Feb. 1, 2008, pp. 1-27.
"Extended European Search Report" and "Written Opinion," European Patent Application No. 14813803.5, dated Jan. 23, 2017, 8 pages.
Office Action dated Mar. 29, 2016 in Japanese Patent Application No. 2015-504768 filed Apr. 8, 2013, pp. 1-16.
Joao, Jose et al., "Flexible Reference-Counting-Based Hardware Acceleration for Garbage Collection," Jun. 2009, ISCA '09: Proceedings of the 36th annual international symposium on Computer Architecture, pp. 418-428.
Office Action dated May 17, 2016, U.S. Appl. No. 14/303,329, filed Jun. 12, 2014.
Final Office Action dated Jun. 1, 2016, U.S. Appl. No. 14/284,351, filed May 21, 2014.
Final Office Action dated Jun. 1, 2016, U.S. Appl. No. 14/171,651, filed Feb. 3, 2014.
Final Office Action dated Jun. 2, 2016, U.S. Appl. No. 13/939,106, filed Jul. 10, 2013.
Advisory Action dated Jul. 6, 2016, U.S. Appl. No. 13/939,106, filed Jul. 10, 2013.
Notice of Allowance dated Jul. 14, 2016, U.S. Appl. No. 14/303,329, filed Jun. 12, 2014.
Non-Final Office Action dated Jul. 25, 2016, U.S. Appl. No. 14/309,796, filed Jun. 19, 2014.
Non-Final Office Action dated Aug. 23, 2016, U.S. Appl. No. 14/055,662, filed Oct. 16, 2013.
Notice of Allowance dated Aug. 24, 2016, U.S. Appl. No. 14/257,905, filed Apr. 21, 2014.
Non-Final Office Action dated Oct. 7, 2016, U.S. Appl. No. 14/171,651, filed Feb. 3, 2014.
Non-Final Office Action dated Nov. 17, 2016, U.S. Appl. No. 14/512,299, filed Oct. 10, 2014.
Notice of Allowance dated Dec. 8, 2016, U.S. Appl. No. 13/441,592, filed Apr. 6, 2012.
Non-Final Office Action dated Jan. 24, 2017, U.S. Appl. No. 14/614,266, filed Feb. 4, 2015.
Non-Final Office Action dated Jan. 30, 2017, U.S. Appl. No. 14/284,351, filed May 21, 2014.
Extended European Search Report for corresponding application No. 14869610.7, dated Jun. 16, 2017; pp. 1-9.

* cited by examiner

MANAGEMENT AND PROVISIONING OF CLOUD CONNECTED DEVICES

TECHNICAL FIELD

This disclosure relates generally to data processing and, more particularly, to management and provisioning of cloud connected devices.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Conventional cloud computing allows sharing computing resources between various applications. In cloud computing, different services, such as storage and applications can be delivered to organization's computers and devices through the Internet. Cloud computing involves a considerable management effort to support software and technologies designed for operating, monitoring, optimization, and proper interaction between users, applications, data, and services residing in the cloud. Cloud management may also involve numerous tasks including performance monitoring, security and compliance auditing and management, as well as initiating and overseeing disaster recovery and contingency plans.

Conventional solutions to address various security concerns include private cloud platforms implemented on a Local-Area Network (LAN) within an organization's firewall. However, because private cloud storage services are managed internally by the organization, they involve high capital and maintenance costs. Additionally, the organization will need to take the responsibility for running and managing resources instead of outsourcing that responsibility to a third-party cloud provider.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

According to an aspect of the present disclosure, a method is provided for provisioning of a service. The method may include receiving one or more availability messages from one or more unbound cloud connected devices. The one or more availability messages may include respective device identifying data. The method may further include receiving, from a user via a web application, a request for the service, the service request including service identifying data. The method may further include correlating the service identifying data to the device identifying data, and based on the correlation, selecting one or more candidate unbound devices from the one or more unbound devices. The method may further include prompting the user to select an unbound device from the one or more candidate unbound devices based on the device identifying data, receiving a selected unbound data device, or a group of devices, from the user, sending a machine generated code to the selected device, prompting the user to confirm ownership of the selected unbound device by entering the machine generated code sent to the selected device, receiving, from the user via the web application, a human entered code. The method may further include comparing the machine generated code to the human entered code and, based on the comparison, selectively binding the selected device to the service.

In certain embodiments, the method may further include handing off communication with the device to a service proxy for further communications between the web application and the selected device. The service proxy may run on a separate machine to provide scalability.

The request for the service may be contingent upon verification of credentials associated with the user. The user service identifying data may include a user public IP address associated with the web application and the device identifying data may include one or more device public IP addresses associated with the one or more unbound devices. The correlating of the service identifying data to the device identifying data may include comparing the user public IP address to the one or more device public IP addresses. In some embodiments, a user may manually provide an IP address.

The web application may be a single-page application running within a web browser. The selected device and the web application can be situated behind the same public IP address. The selected device and the web application may be located within an untrusted domain protected by a firewall.

The web application and the one or more unbound devices may use various security protocols to communicate to the trusted domain. The one or more availability messages from the one or more unbound devices available for binding may be generated automatically when the one or more unbound devices are initialized. The device identifying data may include one or more of the following: an Internet Protocol (IP) address, a host name, a machine address, device identification, cluster identification, and versioning information. The IP address is the source address seen by the backend domain when the device sends messages to the IP address.

In another aspect of the present disclosure, a system is provided for provisioning of a service. The system may comprise a service proxy configured to manage data transmission associated with bound devices utilizing a first data transmission protocol. The system may further include a rendezvous module configured to manage data transmission associated with unbound devices between a website domain utilizing a second data transmission protocol. The website domain may manage a web application accessible to a user. The system may further include a mailbox configured to store identification of the devices.

In another aspect of the present disclosure, the system may further include a supervisor configured to monitor and react to the health of the various services.

In certain embodiments, the website domain may be further configured to authenticate the user and, based on a successful user authentication, associate a web service with an unbound device. The web application may include a Single Page Application (SPA). In certain embodiments, the website domain may be further configured to: receive one or more availability messages from the unbound devices, the one or more availability messages including respective device identifying data, receive, from the user via the web application, a request for the service, the service request including service identifying data, correlate the service identifying data to the device identifying data, based on the correlation, select one or more candidate unbound devices from the one or more unbound devices, prompt the user to select one or a group of unbound devices from the one or more candidate unbound devices based on the device identifying data, receive a selected unbound device or a group of devices from the user, and selectively bind the selected device or group of devices to the service.

In further example embodiments of the present disclosure, the method steps are stored on a machine-readable medium comprising instructions, which when implemented by one or more processors perform the recited steps. In yet further example embodiments, hardware systems or devices can be adapted to perform the recited steps. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements and in which.

DETAILED DESCRIPTION

Figure 1:
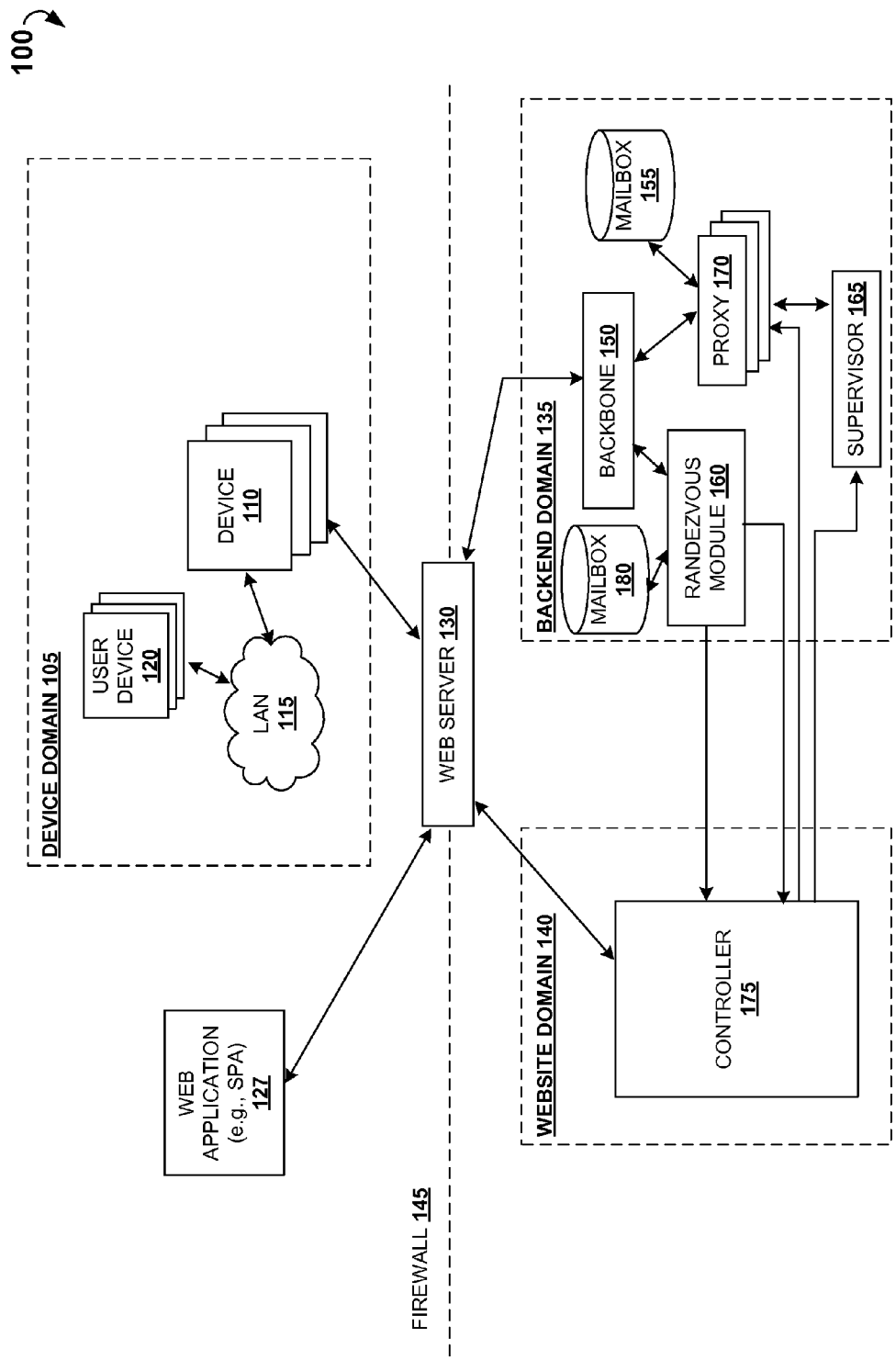
FIG. 1 shows a high level block diagram of system architecture suitable for implementing embodiments of the present disclosure.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive, or a computer-readable medium.

One of many uses of this technology described herein allows providing efficient and seamless storage allocation and scalability, data security and integrity, and enabling users to select specific storage resources with a proof of ownership.

An example architecture may include a web application such as an SPA running within a web browser and devices located on an enterprise LAN. The example architecture may further include a website domain supporting the web application, a device domain supporting the devices, and a backend domain supporting auto-discovery and registration of services to the devices.

The website domain may include a controller coordinating secure protocol requests, such as Secure Hypertext Transfer Protocol (HTTPS), associated with the web application. The backend domain may include a backbone coordinating secure protocol requests, such as HTTPS, associated with the devices on the enterprise LAN. The backend domain may include a rendezvous module to handle communication exchanges between the website and unbound devices. Typically, the web application and devices are located within an untrusted domain while the website and backend are located within a trusted domain from the perspective of the cloud platform. The trusted and untrusted domains may be separated by a firewall. To ensure data integrity, communications between the untrusted and trusted domains may utilize various secure protocols.

Using one or more protocols, when booted, an unbound device may announce itself by posting a message to the mailbox of the rendezvous module. The message may include a device public IP address and other device-related metadata. Once the unbound device is bound to a service associated with the web application, further communications between the device and web application may be handed off to a service proxy mailbox.

The backend domain may also include a supervisor to manage the lifecycle of service proxy instances. One or more proxies may be distributed among a plurality of machines to provide scalability. The supervisor may continue monitoring the mailbox for messages related to the management of the service proxy.

An example method for provisioning a device discovery and registration service may commence with announcement of the presence of a device associated with the architecture described above. A device may contain an agent that can be used to announce the devices presence to a rendezvous module. The rendezvous module may register agent's availability with a controller in the backend domain. The controller may store agent's availability to a database.

A user, having an account with the service, may, upon a successful login, get redirected to a device discovery wizard. Upon verification of user credentials, the controller may enable the device discovery wizard so that the user is prompted to continue and the controller queries a database to determine whether any unbound device may be under administrative control of the currently logged in user. The correlation allows filtering available devices down to a small set of likely candidates. The correlation may be based on a comparison of IP addresses. For example, a public IP address associated with the web application can be compared to a public IP address of the unbound devices. In some instances, a user outside the LAN may be allowed to utilize the system by providing an IP address manually.

After the comparison is made, possible candidates that can be bound to the service are presented, e.g. displayed, to the user along with other information (e.g., a host name, IP, mac address, device ID, cluster ID, versioning information) associated with the devices. The user may be allowed to request administrative control of one or more of these unbound devices by selecting the one or more unbound devices.

Once the user selects a device, or a group of devices, the user is asked to prove the ownership of the device, or a group of devices, by interacting with the device, or a group of devices, through an independent channel of communications, for example, by observing a display of an output device, such as an LCD display, physically coupled to the device. A code previously unknown to the user, can be sent from the controller to the output device associated with the device. In other words, each selected device, or a group of devices, may make the code available for the user to read, for example, by displaying the code on the LCD display associated with the device. The user may be asked to enter the code in the device discovery wizard to prove the ownership. This is an important step in the secure verification and registration process, since upon entering the code in the device discovery wizard, the administrative control of the user for the selected device, or a group of devices, can be confirmed.

Thus, the secured verification process may involve sending a code through one channel of communication to the coupled output device associated with the device with the user providing the code back to the system on a different channel of communication.

FIG. 1 shows a high level block diagram of system architecture 100 suitable for implementing embodiments of the present disclosure. As shown in the figure, a device domain 105 includes one or more devices 110. As shown in the figure, the one or more devices 110 are associated with an organization's LAN 115 having a plurality of user devices 120. The user devices 120 may include any suitable networked, storage and/or computing resources including, for example, desktop computers, laptop computers, tablet computers, cellular phones, smart phones, routers, modems, servicer and storage devices and so forth. The devices 110 may include groups of devices referred to as clusters. The user may be associated with one or more user devices.

The user may utilize a web application 127 through a browser or other application with a user interface. The web application 127 may include, for example, an SPA or similar web service which can be used for binding the one or more device 110 or one or more groups of devices to a service associated with an organization to enable the user to use its storage or computational resources securely.

The system architecture 100 may also include a web server 130 responsible for communication between a backend domain 135, a website domain 140, and the device domain 105. The web server 130 may employ a firewall 145 separating a trusted domain (i.e., the backend domain 135 and the website domain 140) and an untrusted domain. The web server 130 may communicate and transmit data using HTTP, HTTP Secure (HTTPS), or other secure protocols.

Although it is not shown in FIG. 1, the communication and data transmission between the web server 130, backend domain 135, website domain 140, and the device domain 105 may include one or more networks. For example, the one or more networks may include one or more of the following: the Internet, local intranet, PAN (Personal Area Network), LAN (Local Area Network), WAN (Wide Area Network), MAN (Metropolitan Area Network), virtual private network (VPN), storage area network (SAN), frame relay connection, Advanced Intelligent Network (AIN) connection, synchronous optical network (SONET) connection, digital T1, T3, E1 or E3 line, Digital Data Service (DDS) connection, DSL (Digital Subscriber Line) connection, Ethernet connection, ISDN (Integrated Services Digital Network) line, cable modem, ATM (Asynchronous Transfer Mode) connection, or an FDDI (Fiber Distributed Data Interface) or CDDI (Copper Distributed Data Interface) connection. Furthermore, communications may also include links to any of a variety of wireless networks including, GPRS (General Packet Radio Service), GSM (Global System for Mobile Communication), CDMA (Code Division Multiple Access) or TDMA (Time Division Multiple Access), cellular phone networks, GPS, CDPD (cellular digital packet data), RIM (Research in Motion, Limited) duplex paging network, Bluetooth radio, or an IEEE 802.11-based radio frequency network.

The backend domain 135 may support auto-discovery, management, and support of the devices 110 or the groups of devices. The backend domain 135 may include a backbone 150 for coordinating data transmission and handling device requests from the devices 110 or the groups of devices utilizing secure protocols, for example, HTTP or HTTPS protocols. Each device 110 or group of devices may have two main operational states. The first operational state may be "unregistered", meaning that the device 110 or the group of devices is not bound to the service. The second operational state may be "registered", meaning that the device 110 or the group of devices is bound to the service. The backend domain 135 may further include a rendezvous module 160 configured to handle communication exchanges with the website domain 140 for unbound devices 110 or unbound groups of devices and its components utilizing a protocol or protocols, which may be different from the protocol used for communications between service proxy 170, the device 110 or the group of devices, the website domain 140, and the web server 130 after the device or the group of devices is bound to a service. For example, the rendezvous module 160 may utilize JSON-RPC for communication with the website domain 140. The rendezvous module 160 may be associated or operatively coupled to another database referred herein as "mailbox" 180 which can be used by the rendezvous module 160 for sending messages to the unbound devices 110 or the unbound group of devices. Furthermore, the service proxy 170 may be associated or operatively coupled to a database referred herein as "mailbox" 155, which stores identifications, operation statuses and messages of the devices 110 or the groups of devices that have been bound to the service.

Furthermore, the rendezvous module 160 can assign various services to the devices 110 or the group of devices, and associate (bind) the unbound device 110 or the unbound groups of devices with the service once the user of the unbound device 110 or the unbound group of devices is authenticated and proves possession of the unbound device 110 or the unbound group of devices or associated user device(s) or output device(s).

Furthermore, as shown in the figure, the backend domain 135 may include a supervisor 165 for managing the lifecycle of the proxies 170 through monitoring the mailbox 155 for the statuses (flags) of the devices 110 or the group of devices and reacting to the mailbox health of the service. Furthermore, the backend domain 135 may include a backbone 150 through which communication and services may be provided.

Still referring to FIG. 1, the website domain 140 may include a controller 175 configured to handle requests and provide responses to the web application 127 (e.g., SPA) and responsible for user authentication. To these ends, the website domain 140 may include a database for storing user credentials and related information.

Those skilled in the art will understand that the website domain 140 and/or the backend domain 135 may utilize a number of auxiliary components, such as configuration databases, file servers, proxies, storages, computing units, network routers, and so forth, which are omitted for clarity purposes.

Figure 2:
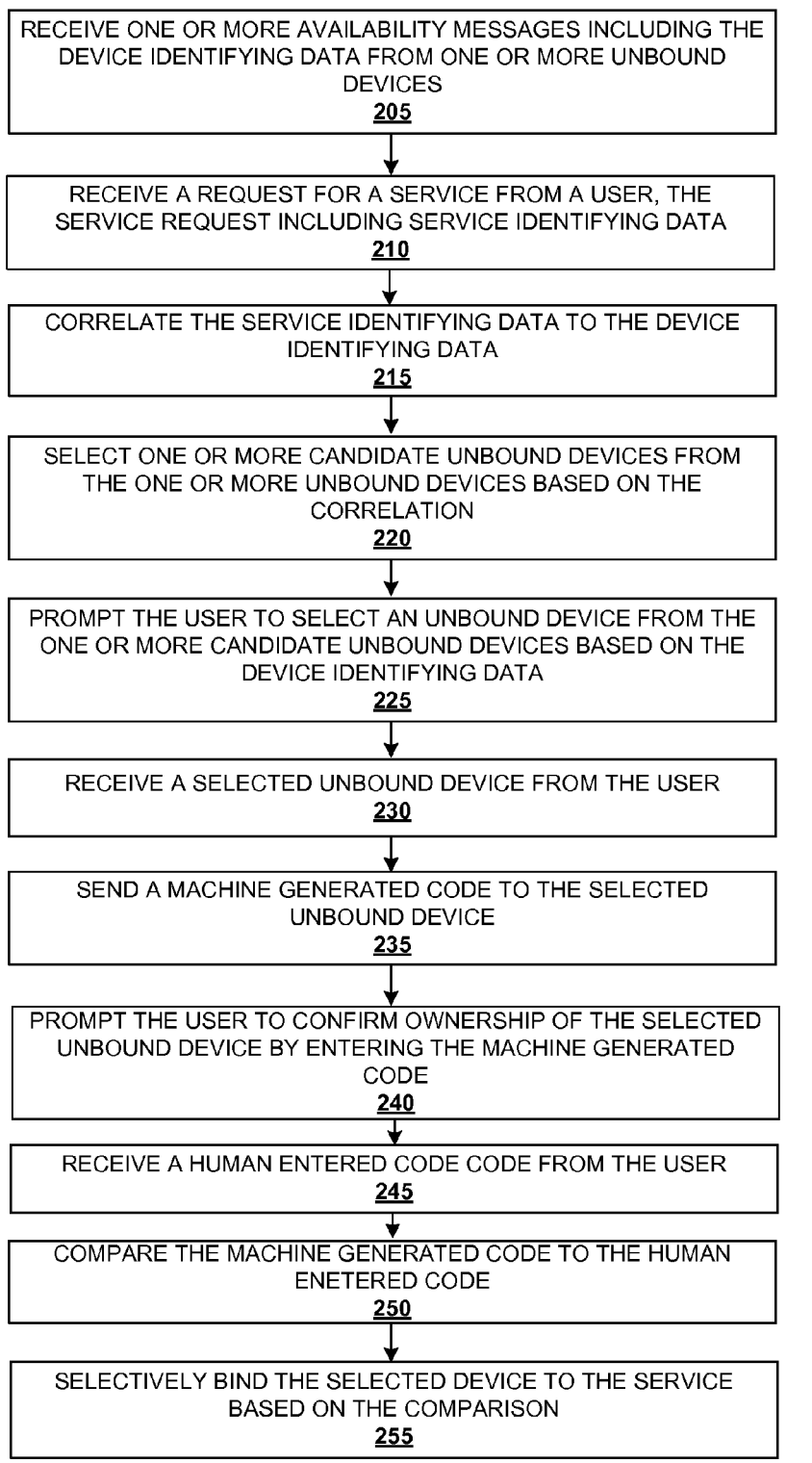
FIG. 2 is a process flow diagram showing a method for provisioning a service according to an example embodiment.

FIG. 2 is a process flow diagram showing a method 200 for provisioning a service according to an example embodiment. The method 200 may be performed by processing logic that may comprise hardware (e.g., decision making logic, dedicated logic, programmable logic, and microcode), software (such as software run on a general-purpose computer system or a dedicated machine), or a combination of both. In one example embodiment, the processing logic resides at the backend domain 135 and/or the website domain 140. In other words, the method 200 can be performed by various components discussed above with reference to FIG. 1.

As shown in FIG. 2, the method 200 may commence at operation 205, at which, in order for the unbound device or the unbound group of devices to bind to the service, the device or the group of devices may send one or more availability messages to the mailbox of the rendezvous module. The availability messages may include respective device identifying data or group identifying data, IP addresses, host names, machine addresses, cluster identifying data, versioning information, and so forth. These messages may be generated, for example, upon initialization (activation) of the unbound device or the unbound group of devices or in response to the user intention to access private data or computational resources through binding the one or more unbound data devices or the one or more unbound groups of devices with the service. A dedicated software agent may be utilized by the one or more unbound devices or the one or more unbound groups of devices to generate and communicate the availability messages. In response to receiving the messages in the mailbox, the rendezvous module may communicate with the website domain in order to announce the unbound device or the unbound group of devices.

At operation 210, the website domain may receive, from the user via the web application, a request for the service, which may include service identifying data or other related information. At this step, the user may be authenticated. To these ends, the user may be prompted to provide credentials (such as logins, passwords, pin codes, and so forth), which can be matched to the records of the database.

At operation 215, the controller may correlate the service identifying data to the device identifying data or the group identifying data stored in the mailbox associated with the proxy. In certain embodiments, the service identifying data may include a user public IP address associated with the user, while the device identifying data may include a device public IP address associated with the one or more unbound devices and the group identifying data may include a group public IP address associated with the one or more unbound groups of devices. The user public IP address may include IP address of the user browser. Accordingly, the correlation operation 215 may involve comparing the user public IP address to the device public IP address or the group public IP address. In various embodiments, the user public IP address may be either automatically determined or manually provided by the user.

At operation 220, the controller may select one or more candidate unbound devices from the one or more unbound devices or one or more candidate unbound groups of devices from the one or more unbound groups of devices based on the correlation and data stored in various databases. In certain circumstances, the device public IP address may relate to a plurality of user devices, network devices or other devices. Accordingly, at operation 225, the user is prompted to select one unbound device from the one or more candidate unbound data devices based on the device identifying data, or select one unbound group of devices from the one or more candidate unbound groups of devices based on the group identifying data. For example, the web application may show to the user available devices or available groups of devices and the user may select one device or one group of devices, which is in the possession of the user or which the user wants to utilize. At operation 230, the controller receives a selected unbound device from the user.

At operation 235, the controller (or, in some circumstances, the backend domain) can send a machine generated code to a coupled output device associated with the selected device or the selected group of devices. The code may relate to alpha-numerical message, randomly generated, still or animated image, audio message, or activation instruction. Upon receipt of the machine generated code by the corresponding output device associated with the unbound device or the unbound group of devices, the machine generated code may be shown on a display. It should be understood that the machine generated code is not limited to visual.

At operation 240, the user may be prompted to confirm the ownership of the selected unbound device by entering the machine generated code utilizing the user device or other apparatus associated with the selected device or the selected group of devices. For example, the web application may prompt the user to input the machine generated code.

At operation 245, the controller may receive, from the user via the web application, a human entered code. At operation 250, the controller may compare the machine generated code to the human entered code and, at operation 255, selectively bind the selected device or the selected group of devices to the service based on the results of the comparison. The backend domain can generate a corresponding record in the mailbox. In certain embodiments, the service may be handed off to the proxy to provide secure data communications. Additionally, a number of other security and data integrity policies pertaining to the device or the group of devices may be implemented. The proxy may run on a separate machine (i.e., outside the backend domain) to provide sufficient scalability. The proxy may be responsible for receiving backbone messages in the mailbox, policing inbound messages to ensure that the messages are coming from devices or the group of devices that are bound to the service, monitoring the connection status of the devices or the group of devices and proxying unbound backbone messages that originate from the website domain to the mailbox.

Figure 3:
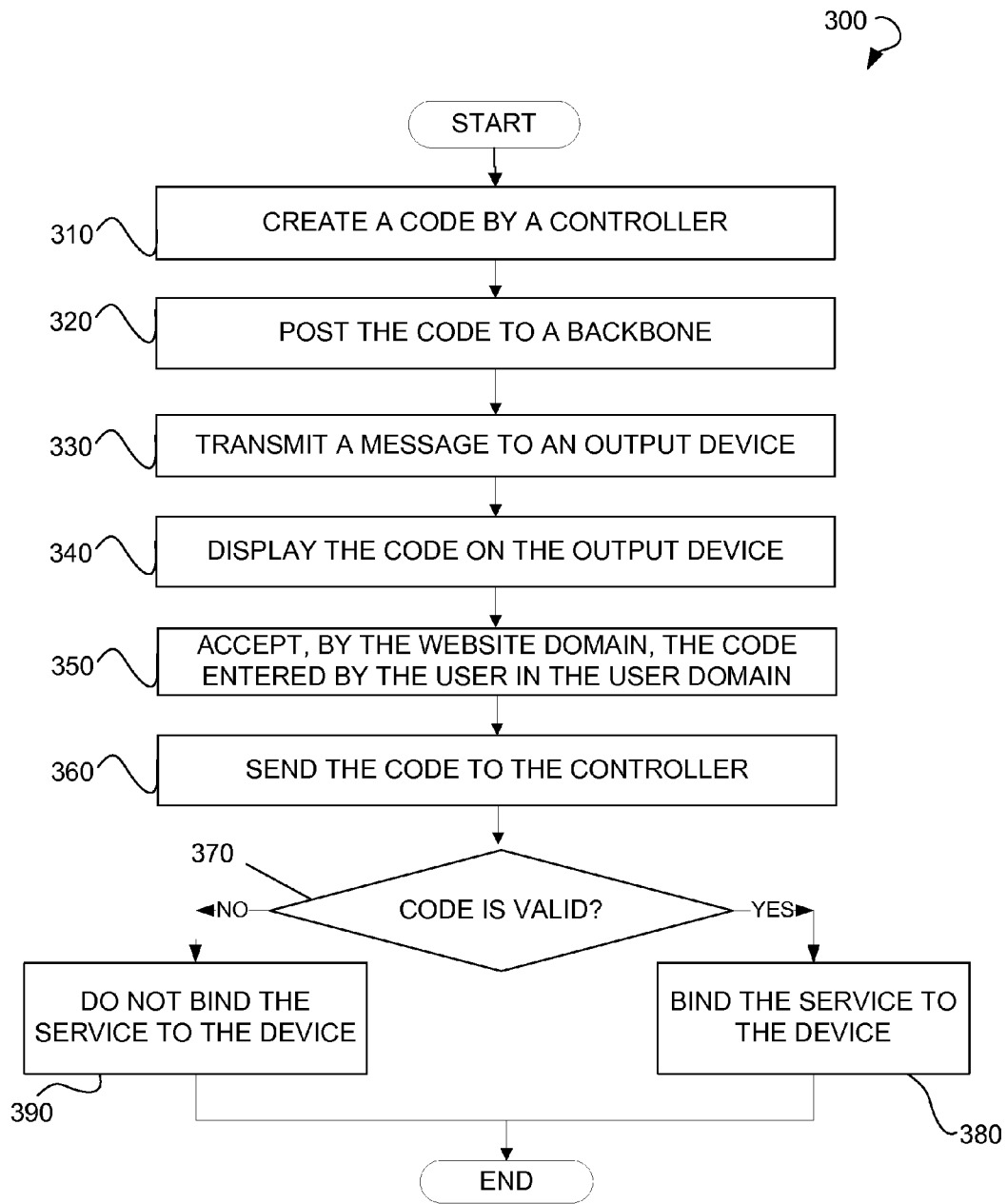
FIG. 3 is a flow chart illustrating an example method for device ownership verification according to an example embodiment.

FIG. 3 shows a flow chart illustrating an example method 300 for device ownership verification. The method 300 may commence with a controller creating a code at operation 310. At operation 320, the code may be posted to the backbone. The backbone may transmit a message containing the code to the output device at operation 330. The code may be displayed on a display of the output device at operation 340. The user may then enter the displayed code in a device discovery wizard. At operation 350, the code entered by the user in the user domain may be accepted by the website domain and, at operation 360, the code may be sent back to the controller. A comparison of the two codes can be performed at operation 370. Based on the comparison, the service can be bound to the device at operation 380 and a message can be sent to a proxy associated with the service notifying the proxy that it is now responsible for the device.

Then a message can be sent to the rendezvous module notifying the rendezvous module that the device is now owned the service. If, on the other hand, the code entered by the user is not valid, the service is not bounded to the device at operation 390.

Figure 4:
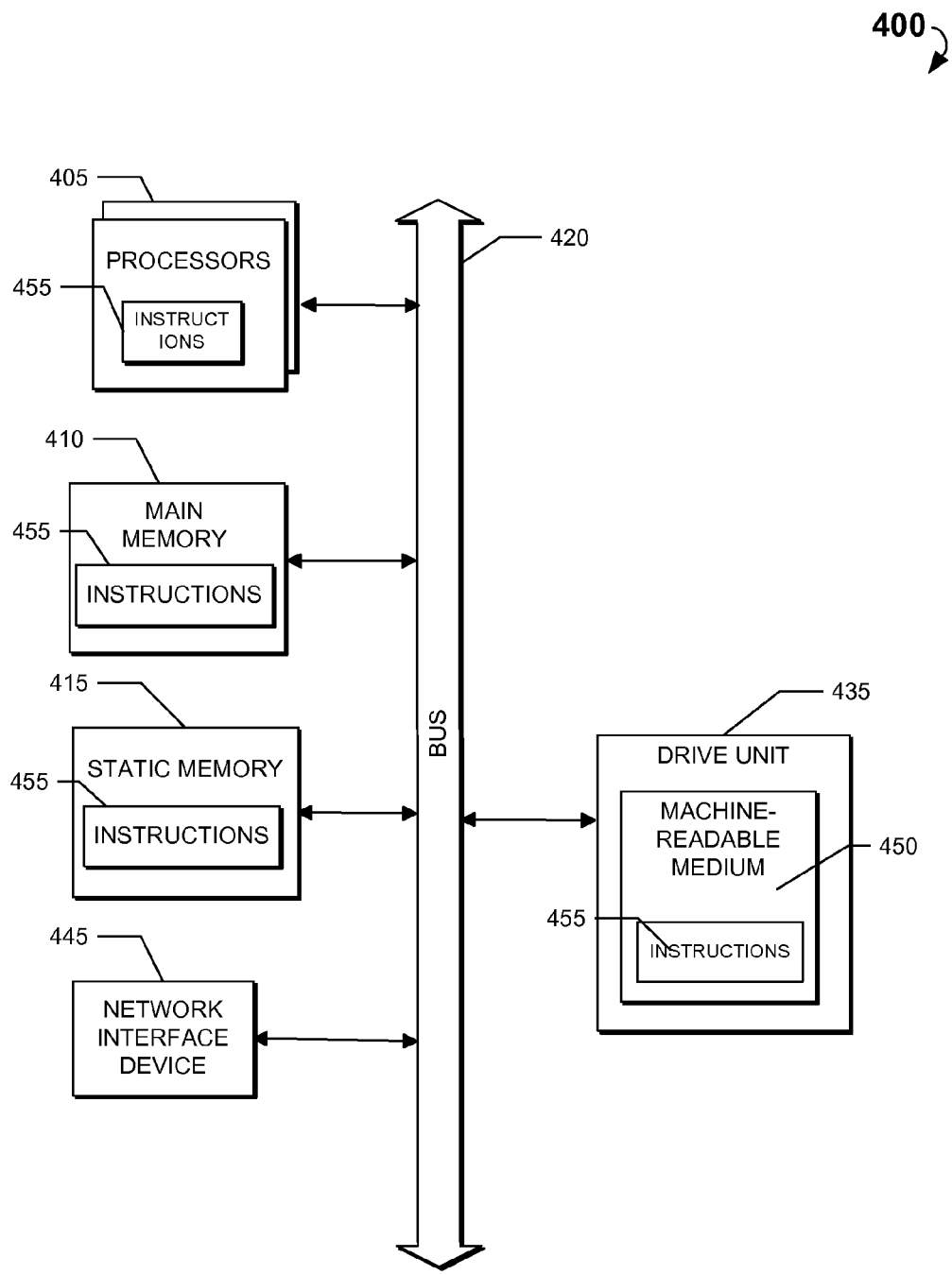
FIG. 4 shows a diagrammatic representation of a computing device for a machine in the example electronic form of a computer system, within which a set of instructions for causing the machine to perform any one or more of the methodologies discussed herein can be executed.

FIG. 4 shows a diagrammatic representation of a computing device for a machine in the example electronic form of a computer system 400, within which a set of instructions for causing the machine to perform any one or more of the methodologies discussed herein can be executed. In various example embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a web appliance, a network router, a switch, a bridge or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor or multiple processors 405, a disk drive unit 435, a main memory 410 and a static memory 415, which communicate with each other via a bus 420. The computer system 400 may also include a network interface device 445 and coprocessors dedicated for data compression and object identifier cryptographic calculation.

The disk drive unit 435 may include a computer-readable medium 450, which stores one or more sets of instructions 455 embodying or utilized by any one or more of the methodologies or functions described herein. The instructions 455 can also reside, completely or at least partially, within the main memory 410 and/or within the processors 405 during execution thereof by the computer system 400. The main memory 410 and the processors 405 also constitute machine-readable media such as, for example, an HDD or SSD.

While the computer-readable medium 450 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks, random access memory (RAM), read only memory (ROM), hard disk drives (HDD), solid state disks (SSD), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, C, C++, C#, Python, Go, or other compilers, assemblers, interpreters or other computer languages or platforms.

Thus, methods and systems for provisioning a service in networked architecture are disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for provisioning of a device discovery and registration service, the method comprising:
receiving one or more availability messages from one or more unbound devices, the one or more availability messages stored by a controller to a database, the one or more availability messages including respective device identifying data including public IP addresses associated with the one or more unbound devices;
receiving, from a user via a web application, a request for a service associated with the web application, the request including service identifying data including a public IP address associated with the web application;
comparing the public IP address associated with the web application to the public IP addresses associated with the one or more unbound devices;
based on the comparing of the public IP address associated with the web application to the public IP addresses associated with the one or more unbound devices, selecting one or more candidate unbound devices from the one or more unbound devices;
prompting the user to select an unbound device from the one or more candidate unbound devices based on the device identifying data;
receiving, from the user, a selected unbound device;
sending a machine generated code to the selected unbound device, the machine generated code sent from the controller;
prompting the user to confirm ownership of the selected unbound device by entering the machine generated code sent to the selected unbound device;
receiving, from the user via the web application, a human entered code;
comparing the machine generated code to the human entered code; and
based on the comparing of the machine generated code to the human entered code, selectively binding the selected unbound device to the service associated with the web application.

2. The method of claim 1, further comprising handing off the service associated with the web application to a service proxy for further communications between the web application and the selected device.

3. The method of claim 2, wherein the service proxy runs on a second machine that is separate from a first machine that performs the selective binding to provide scalability.

4. The method of claim 1, wherein the machine generated code is generated randomly.

5. The method of claim 1, wherein the machine generated code is generated using a cryptographically secure algorithm.

6. The method of claim 1, wherein the request for the service is contingent upon verifying credentials associated with the user.

7. The method of claim 1, wherein the public IP address associated with the web application is provided by the user.

8. The method of claim 1, wherein the web application is a single-page application running on a user device and is connected to the service associated with the web application in a trusted domain.

9. The method of claim 1, wherein the selected device and the web application are situated behind the same public IP address.

10. The method of claim 1, wherein the web application and the one or more unbound devices use secure protocols to communicate through an untrusted domain.

11. The method of claim 1, wherein the one or more availability messages from the one or more unbound devices are generated automatically when the one or more unbound devices are available to be bound.

12. The method of claim 1, wherein the device identifying data further includes one or more of a host name, a machine address, a device identification, a cluster identification, and versioning information.

13. A method for provisioning of a group of devices discovery and registration service, the method comprising:
receiving one or more availability messages from one or more unbound groups of devices, the one or more availability messages stored by a controller to a database, the one or more availability messages including respective group identifying data including public IP addresses associated with the one or more unbound groups of devices;
receiving, from a user via a web application, a request for a service associated with the web application, the request including service identifying data including a public IP address associated with the web application;
comparing the public IP address associated with the web application to the public IP addresses associated with the one or more unbound groups of devices;
based on the comparing of the public IP address associated with the web application to the public IP addresses associated with the one or more unbound groups of devices, selecting one or more candidate unbound groups of devices from the one or more unbound groups of devices;
prompting the user to select an unbound group of devices from the one or more candidate unbound groups of devices based on the group identifying data;
receiving, from the user, a selected unbound group of devices;
sending a machine generated code to the selected unbound group of devices, the machine generated code sent from the controller;
prompting the user to confirm ownership of the selected unbound group of devices by entering the machine generated code sent to the selected unbound group of devices;
receiving, from the user via the web application, a human entered code;
comparing the machine generated code to the human entered code; and
based on the comparing of the machine generated code to the human entered code, selectively binding the selected unbound group of devices to the service associated with the web application.

14. The method of claim 13, further comprising handing off the service associated with the web application to a service proxy for further communications between the web application and the selected group of devices.

15. The method of claim 13, wherein the service proxy runs on a second machine that is separate from a first machine that performs the selective binding to provide scalability.

16. The method of claim 13, wherein the machine generated code is generated randomly.

17. The method of claim 13, wherein the machine generated code is generated using a cryptographically secure algorithm.

18. The method of claim 13, wherein the request for the service is contingent upon verifying credentials associated with the user.

19. The method of claim 13, wherein the public IP address associated with the web application is provided by the user.

20. The method of claim 13, wherein the web application is a single-page application running on a user device and is connected to the registration service associated with the web application in a trusted domain.

21. The method of claim 13, wherein the selected group of devices and the web application are situated behind the same public IP address.

22. The method of claim 13, wherein the web application and the one or more unbound groups of devices use secure protocols to communicate through an untrusted domain.

23. The method of claim 13, wherein the one or more availability messages from the one or more unbound groups of devices are generated automatically when the one or more unbound group of devices are available for binding.

24. The method of claim 13, wherein the group identifying data further includes one or more of a host name, a machine address, a group identification, a cluster identification, and versioning information.

25. A non-transitory computer-readable medium having embodied thereon a program, the program being executable by a processor to perform a method for provisioning of a device or a group of devices discovery and registration service, the method comprising:
receive one or more availability messages from one or more unbound devices or one or more unbound groups of devices, the one or more availability messages stored by a controller to a database, the one or more availability messages including respective device identifying data or group identifying data, including public IP addresses associated with the one or more unbound devices or groups of devices;
receive, from a user via a web application, a request for a service associated with the web application, the service request including service identifying data including a public IP address associated with the web application;
compare the public IP address associated with the web application to the public IP addresses associated with the one or more unbound devices or groups of devices;
based on the compare of the public IP address associated with the web application to the public IP addresses associated with the one or more unbound devices or groups of devices, select one or more candidate unbound devices from the one or more unbound devices or one or more candidate unbound groups of devices from the one or more unbound groups of devices;

prompt the user to select an unbound device from the one or more candidate unbound devices based on the device identifying data or an unbound group of devices from the one or more candidate unbound groups of devices based on the group identifying data;

receive, from the user, a selected unbound device or a selected unbound group of devices;

send a machine generated code to a device associated with the selected unbound device or the selected unbound group of devices, the machine generated code sent from the controller;

prompt the user to confirm ownership of the selected unbound device or the selected unbound group of devices, by entering the machine generated code sent to the device associated with the selected unbound device or the selected unbound group of devices;

receive, from the user via the web application, a human entered code;

compare the machine generated code to the human entered code; and based on the compare of the machine generated code to the human entered code, selectively bind the selected unbound device or the selected unbound group of devices to the service associated with the web application.

* * * * *